(12) United States Patent
Wang et al.

(10) Patent No.: US 7,933,442 B2
(45) Date of Patent: Apr. 26, 2011

(54) APPEARANCE MANIFOLDS FOR MODELING TIME-VARIANT APPEARANCE OF MATERIALS

(75) Inventors: Jiaping Wang, Beijing (CN); Xin Tong, Beijing (CN); Stephen Lin, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 11/694,840

(22) Filed: Mar. 30, 2007

(65) Prior Publication Data

US 2008/0240540 A1    Oct. 2, 2008

(51) Int. Cl.
*G06K 9/00* (2006.01)
(52) U.S. Cl. ........................................ 382/141
(58) Field of Classification Search .................. 382/141, 382/149, 284; 348/86, 92, 125; 700/109, 700/110
See application file for complete search history.

(56) References Cited

OTHER PUBLICATIONS

Lu, et al. "Synthesis of Material Drying History: Phenomenon Modeling, Transferring and Rendering", pp. 1-10, 2005.*
Sun, et al. "Time-Varying BRDFs", pp. 1-9, Sep. 2006.*
Yanyun Chen et al. "Visual simulation of weathering by γ-ton tracing", International Conference on Computer Graphics and Interactive Techniques, ACM SIGGRAPH 2005 Papers, 2005.
Jiaping Wang et al. "Appearance Manifolds for Modeling Time-Variant Appearance of Materials", ACM Transactions on Graphics (TOG), vol. 25 , Issue 3 (Jul. 2006), Proceedings of ACM SIGGRAPH 2006, Session: Appearance representation, 2006.
Jingdan Zhang et al. "Synthesis of progressively-variant textures on arbitrary surfaces", International Conference on Computer Graphics and Interactive Techniques, ACM SIGGRAPH 2003 Papers, 2003.

* cited by examiner

*Primary Examiner* — Daniel G Mariam
(74) *Attorney, Agent, or Firm* — Lee & Hayes, PLLC

(57) ABSTRACT

A method for modeling a time-variant appearance of a material is described. A sample analysis of a material sample is performed, wherein the sample analysis orders surface points of the material sample with respect to weathering from data captured at a single instant in time. An appearance synthesis using the sample analysis is performed, wherein the appearance synthesis generates a time-variant sequence of frames for weathering an object.

20 Claims, 11 Drawing Sheets

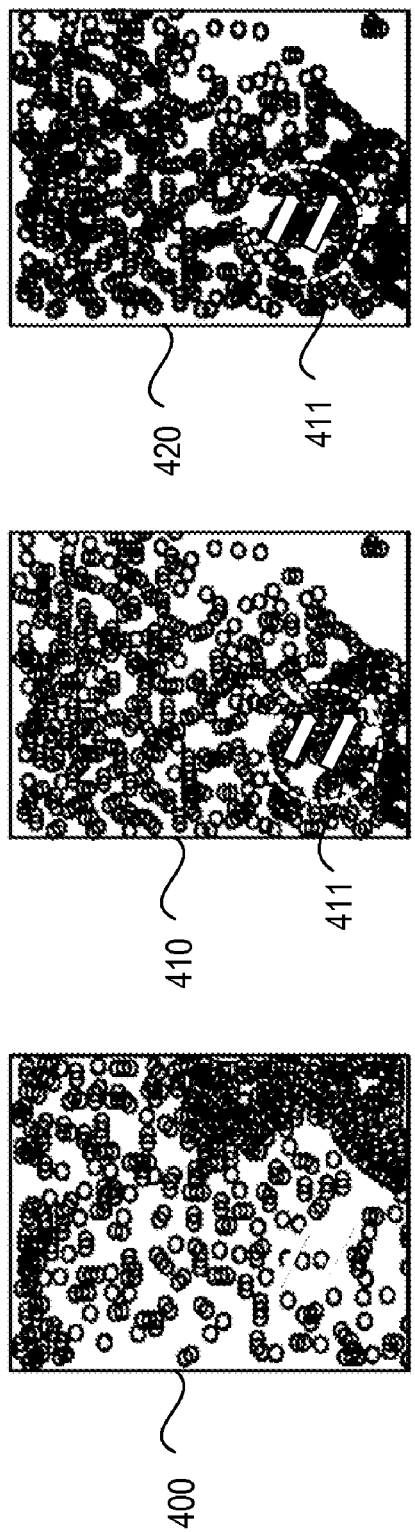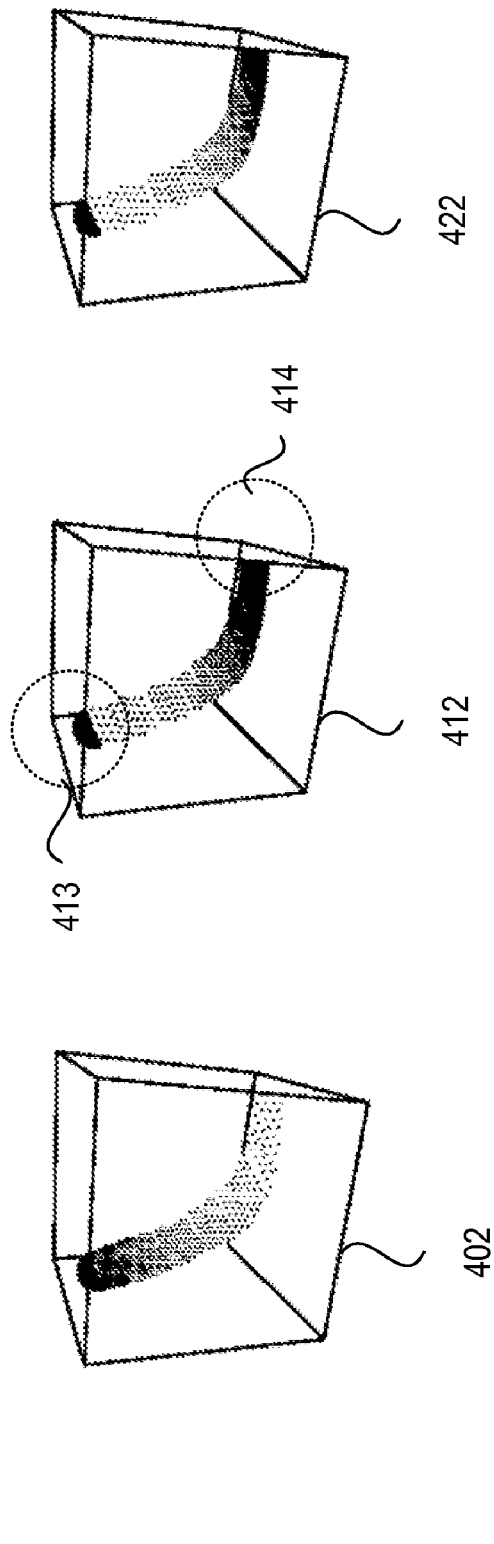
FIG. 4A  FIG. 4B  FIG. 4C

APPEARANCE MANIFOLDS FOR MODELING TIME-VARIANT APPEARANCE OF MATERIALS

BACKGROUND

Materials in the real world exhibit spatial variations that arise naturally over the course of time. Large scale variations in material appearance are mainly influenced by global factors such as object geometry and weathering environment, while the local variations in weathered appearance are often intrinsic to the material, a natural characteristic of how it looks.

One approach for generating time-variant material appearance is to visually simulate the distribution of weathering effects on a 3-Dimensional (3D) model. Existing visual simulation techniques can successfully generate large scale variations of material appearance based on global factors such as object geometry and weathering environment. However, these techniques are limited in their ability to produce local characteristics that are intrinsic to a material.

An alternative approach is to simulate the weathering interactions of a material based on physical principles. While realistic results have been produced through such simulations, they require substantial computation, and for each new material a complete understanding of its physical weathering process needs to be developed. Another way to obtain physically accurate appearance is to capture a video of a material over time to obtain real-life information on how appearance changes as weathering progresses. Such data-intensive techniques are often challenging in practice because of the need for considerable labor and time. Moreover, technical difficulties with image registration and data storage arise when recording time-variant Bidirectional Reflectance Distribution Functions (BRDFs) in addition to surface colors.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments herein use a visual simulation technique called appearance manifolds for modeling the time-variant surface appearance of a material from data captured at a single instant in time. In modeling time-variant appearance, embodiments of the invention take advantage of the observation that concurrent variations in appearance over a surface represent different degrees of weathering. By reorganizing these various appearances in a manner that reveals their relative order with respect to weathering degree, spatial and temporal appearance properties of the material's weathering process are determined that can be used to generate its weathered appearance at different points in time.

Example applications include visual simulation of weathering on 3D models. In another example, appearance manifolds may be used to increase or decrease the weathering on an object. In yet another example, weathered material may be transferred from one object to another, resulting in a material transformation with realistic weathering detail.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

FIG. 4A shows a phase of sample analysis in accordance with an embodiment of the invention.

FIG. 4B shows a phase of sample analysis in accordance with an embodiment of the invention.

FIG. 4C shows a phase of sample analysis in accordance with an embodiment of the invention.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Introduction

For realistic and easy modeling of weathered appearance of materials, embodiments of a visual simulation technique is presented that acquires time variant appearance information from data captured at a single instant in time. Embodiments herein capitalize on the key observation that at a given instant, spatial variations in surface appearance on a weathered material sample correspond to varying degrees of weathering. These appearance variations are utilized to construct an appearance manifold that approximates an underlying intrinsic structure of weathered surface point appearances for the material. The relative degrees of weathering among these surface point appearances can be inferred from the path of this variation. By assigning the weathering degrees to corresponding appearance states, spatial and temporal characteristics of the material's weathered appearance may be determined, including local appearance properties and valid progressions of surface point appearance over time.

Embodiments herein utilize these time-variant appearance characteristics to generate convincing weathered appearance of the material sample at different points in time. Embodiments herein use a new texture synthesis algorithm to generate a time-variant appearance sequence for a given material and object. Although embodiments herein do not perform a physically-based weathering simulation, they can easily synthesize natural-looking non-linear progressions of weathered appearance and its spatial variations.

Figure 1:
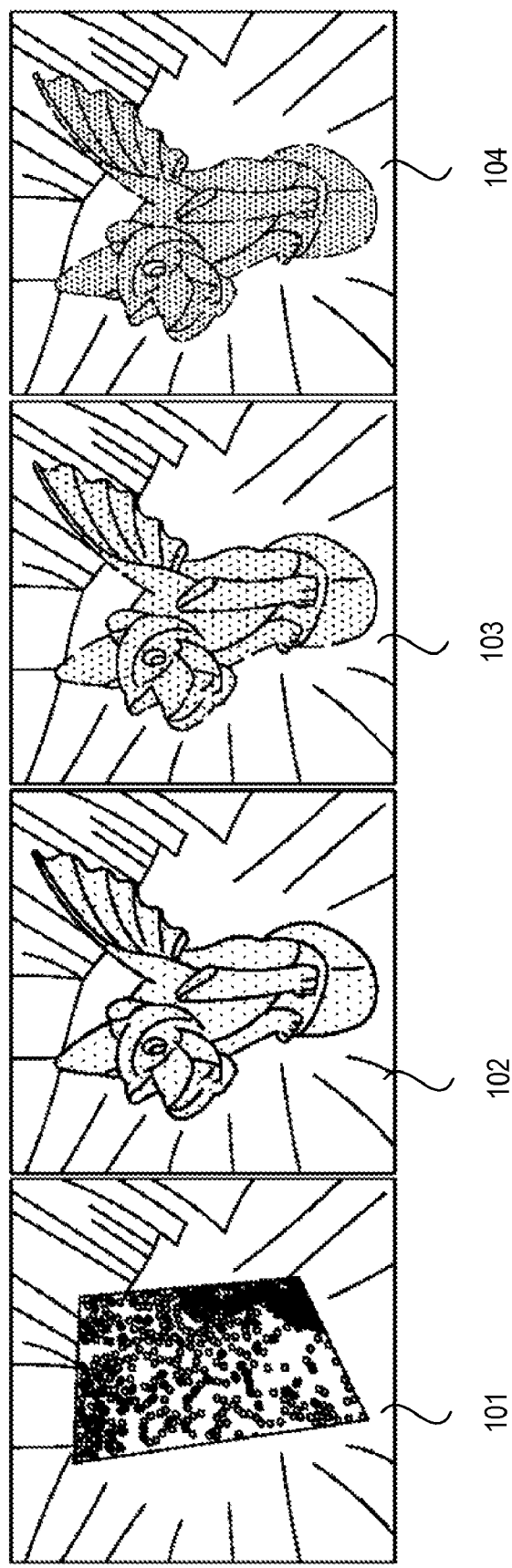
FIG. 1 shows modeling the time-variant surface appearance of a material in accordance with an embodiment of the invention.

For example, referring to FIG. 1, synthesis of time-variant weather appearance from the spatially variant BRDFs of a rusted iron sample measured at a single instant in time is shown at 101. This appearance synthesis may be applied to the 3D gargoyle model shown at 102-104. The gargoyle model is rendered at different points in time from earliest (i.e., least weathering) at 102 to oldest (i.e., most weathering) at 104.

It will be noted that the appearance manifold is constructed from data captured at a single instant in time making techniques described herein versatile and easy to use. Embodiments of the invention also include time-variant weathering appearance from a single color image for a weather effect that mainly alters color features.

In one application, images of time-variant materials may be applied to 3D objects. Such objects may used in various applications, such as video games, computer generated images (CGI) in movies, and the like. In another application, appearance manifolds can be applied for increasing or decreasing the weathering of a real object. A real object refers to an object that is scanned (e.g., using a 3D laser scanner) from a real world object. In contrast, a synthetic object is generated by an artist from its beginning. In another application, weathered material from one object may be transferred to another object.

Overview

Figure 2:
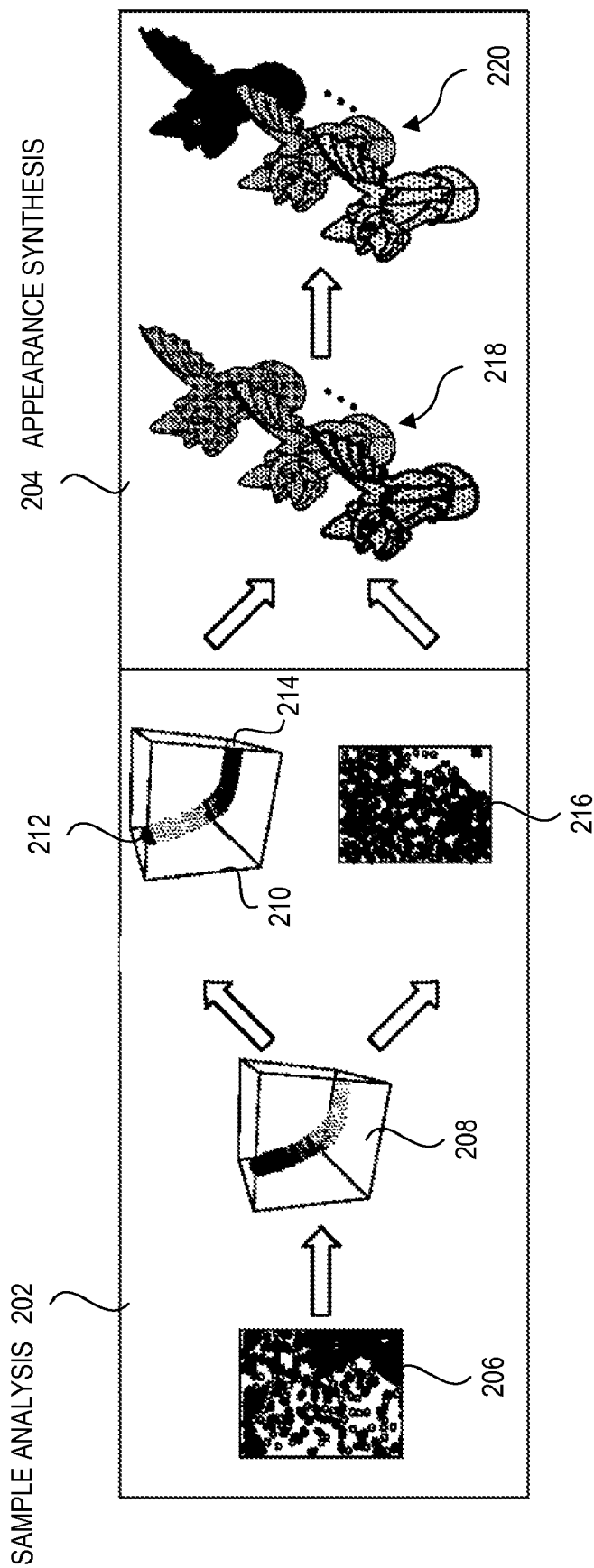
FIG. 2 is a block diagram of modeling the time-variant appearance of a material in accordance with an embodiment of the invention.

From spatially variant BRDF data captured from a weathered material sample at a single instant in time, the appearance variations on the sample are analyzed to obtain spatial and temporal appearance properties useful for synthesis of weathered effects. Embodiments of modeling the time-variant surface appearance of a material from data captured at a single instant in time includes two phases: sample analysis 202 and appearance synthesis 204 as shown in FIG. 2. In sample analysis, an appearance manifold is constructed from material data captured from a material sample 206, and with some simple user annotation, the weathering degrees of each appearance state and their spatial distribution is inferred. Appearance synthesis uses the information from sample analysis and an input time-variant degree distribution to generate time-variant weathered appearance on a surface.

Sample Analysis

In embodiments herein, the course of weathering is assumed to produce gradual monotonic transformations in appearance that exist at spatially varying degrees over the surface of the material sample, such that the various states of per-pixel appearance form a manifold in an appearance space. To obtain a good approximation of this underlying manifold, the process plots the captured BRDF data of each surface point in an appearance space defined by reflectance features, and construct a neighborhood graph among these sample points. The neighborhood graph is referred to as an appearance manifold 208. With some annotations by a user, embodiments herein infer from the relative positions of points on the appearance manifold (annotated appearance manifold 210) the points' relative degrees of weathering (weathering degree map 216).

Since sample points in the appearance space typically form a dense distribution, the k-nearest rule (discussed below) may be utilized to build the graph and then disconnect links having distances longer then the threshold to prune outliers. The user is prompted to highlight some regions at early/later stages of weathering (most weathering at 212 and least weathering at 214). With this hint, the relative weathering degrees on the constructed neighborhood graph are deduced to form the appearance manifold.

The appearance manifold describes the weathering degree of the points on the material. The weathering degree is a relative value. That is, the degree for the most weathered point on the object is 1.0 and vice versa. It is noted that the appearance manifold is related to the weathering of the material and not related to the weathering of a particular object. For example, the appearance manifold is not related to weathering distribution on the object affected by the shape of the object.

From the structure of the resulting appearance manifold, an ordering of points with respect to weathering degree is inferred. This is ordering of points is referred to herein as a "source weathering degree map" (or just "weathering degree map.") The weathering degree map characterizes local distribution of weathering degree variations for the given material and weathering process. The weathering degree map is the collection of the weathering degree of all points on the surface.

Thus, from the association of weathering degrees to appearance states in the appearance manifold, two characteristics of the material's time-variant appearance can be derived. First, since weathering degrees should be non-decreasing over time, the determination of weathering degrees indicates valid temporal progressions in the appearance of a surface point. Second, by assigning these weathering degrees to points on the material sample, a weathering degree map is obtained that characterizes local distributions of weathering degree variations for the given material sample and weathering process. With the assignment of degree values to points in the appearance manifold, the relative weathering degrees of the various per-pixel appearance states may be determined, and hence the valid temporal sequences of pixel appearance.

Appearance Synthesis

With the appearance manifold and weathering degree map of a material sample, detailed weathering appearance onto a 3D model may be synthesized according to a given large scale time-variant distribution of weathering degrees over the surface (time-variant weathering degree map on gargoyle surface shown at 218). This weathering degree distribution can be generated using existing visual simulation techniques or by manual user specification. Local weathering appearance is then synthesized onto the model using the appearance manifold and weathering degree map. The resulting time-variant appearance on the gargoyle surface is shown at 220.

In one embodiment, the resulting appearance sequence may also adhere to two temporal constraints. First, the time-variant appearance sequence for each pixel follows a valid path in the appearance manifold. Second, the spatial characteristics of appearance change smoothly over time. For this purpose, a multi-scale texture synthesis technique based on a progressive texture synthesis approach is used.

In embodiments of a synthesis algorithm, the appearance sequence is synthesized frame by frame. The degree values of each frame are initialized by extrapolating those of the preceding frame except for the first frame that is initialized randomly. To determine an initial appearance for the frame, an interpolation is conducted according to the initial degree values along the shortest path in the appearance manifold. Although this initialization produces consistent spatial appearance characteristics through the temporal sequence, it does not account for progressive texture variations from frame to frame. To obtain an improved initialization, randomness is introduced by averaging appearance values with values in patches that are randomly selected from source regions. Each initial appearance frame is then refined by synthesis with multiple neighborhood scales with the temporal constraints introduced above.

Sample Analysis

Figure 3:
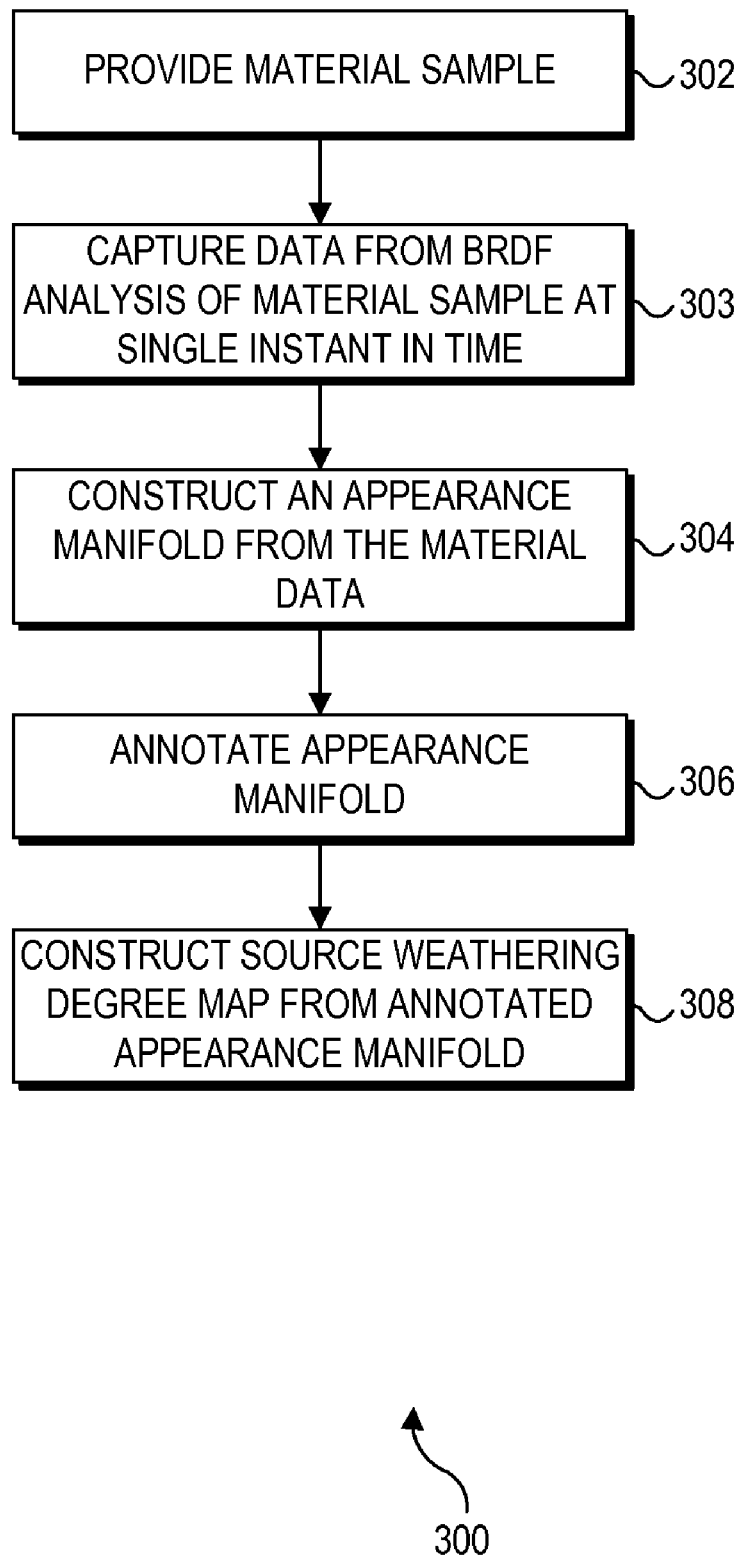
FIG. 3 is a flowchart showing the logic and operations of sample analysis in accordance with an embodiment of the invention.

Turning to flowchart 300 of FIG. 3, the logic and operations of a sample analysis in accordance with an embodiment of the invention is shown. Starting in block 302, a material sample image for analysis is provided. The material sample may include organic material or inorganic material. The material sample may include a non-living object or a living object. Also, the material sample may include material with different optic properties, such as opaque material and translucent material.

With data captured from a material sample (block 303), an appearance manifold is formed by constructing the neighborhood graph for the BRDFs of surface points (block 304). From the appearance manifold, the relative weathering degrees of the various per-pixel appearance states are deduced, and hence, the valid temporal sequences of pixel appearance. With this weathering degree information, a weathering degree map is formed that represents spatial variations in weathering degree that are present on the sample.

As used herein, spatial variations refer to the concept that different points on the sample having different degrees of weathering. Time variation refers to the idea that a point becomes more weathered over time.

While Bidirectional Reflectance Distribution Functions (BRDFs) are well known to one skilled the art, a short summary is provided here. A BRDF provides the reflectance of a surface as a function of illumination geometry and viewing geometry. In simpler terms, a BRDF describes how an object appears based on the direction of illumination of the object and the direction of the observer from the object. BRDF is a property of the object surface and is defined over an infinite number of angles towards the illumination source and towards the observer. The BRDF of a surface may be defined by mathematical models or directly measured from real world material samples.

Appearance Manifolds

In mathematics, "manifolds" describe complicated structures in simpler spaces. Additional structures may be defined on manifolds. "Appearance manifolds" refers to the connected smooth shape for a weathering appearance on an object in the appearance space.

In constructing the neighborhood graph of a given material sample I(x,y), the n-dimensional appearance attributes of each pixel (x,y) is organized into a vector, which is plotted as a point in a corresponding n-dimensional appearance space. A spatially-variant BRDF from flat material samples is captured using a linear light source device. To the BRDF of each point, parameters of the isotropic Ward model are fitted such that a 7D appearance space is formed for the material samples.

Since sample points in the appearance space typically form a dense distribution as exemplified in FIG. 4A (diffuse image of rusted iron sample shown at 400 and corresponding initial appearance manifold shown at 402), the $\epsilon$-rule and k-rule are utilized to construct the neighborhood graph. Specifically, an initial graph is formed using the k-rule, which connects each point (i.e., the appearance value of a surface point; when this appearance value is projected in appearance space, it is a point in appearance space.) to its k nearest neighbors (for all examples herein k=8). Outliers in the graph are then pruned using the $\epsilon$-rule, which allows connections only between points separated by a distance less than a threshold $\epsilon$. In embodiments herein, $\epsilon=1.5 d_p$ where $d_p$ is the average pairwise (i.e., point-to-point) distance between connected points after applying the k-rule. To compute $d_p$, an appearance vector is first constructed for each of the two points by sampling its BRDF over a set of lighting and viewing directions. The distance of the two samples is then computed by the distance of their appearance vectors in a logarithm space.

From the structure of the resulting neighborhood graph, an ordering of points is inferred with respect to weathering degree. One possible approach is to perform dimensionality reduction to map the data into a 1D curve that indicates relative degrees of weathering. However, this mapping may be influenced by secondary appearance variations, such as from material non-uniformity and incidental weathering processes, that are non-orthogonal to the principal mode of weathering variation. Consequently, weathering degrees might not be reliably determined in this manner. For example, although the two points indicated by arrows in FIG. 4B exhibit no weathering, their appearance variations lead to different estimates of weathering degree by dimensionality reduction. In FIG. 4B, associated weathering degrees are determined using isomap reduction to 1D, exhibited in both the appearance manifold 412 and the weathering degree map 410. Two unweathered points (indicated by arrows 411 in weathering degrees map 410) with different BRDFs are mistakenly assigned to different weathering degrees.

As shown in block 306, the appearance manifold is annotated, such as by a user. To approximately factor out the effects of non-orthogonal secondary variations from weathering degrees, user interaction may be utilized to incorporate high-level knowledge into the analysis process. Specifically, the user assists by identifying sets of most weathered and least weathered points in the appearance manifold. In appearance manifold 412, the user has annotated some most weathered points at 413 and some least weathered points at 414. In one embodiment, the user only needs to specify a small set of most weathered points and least weathered points and then the system may extend the sets of points.

In one embodiment, the user is prompted to highlight pixels in I(x,y) to form initial sets $X_0'$ and $X_1'$ of least and most weathered points, respectively. The set $X_1'$ of most weathered points is then dilated according to $$X_1 = \{x_i | \phi(x_i, x_0') > \lambda \Phi(X_0', X_1')\},$$

where the appearance distance $\phi(x_i, x_j)$ between points $x_i$ and $x_j$ is defined as their geodesic distance in the manifold (e.g., the shortest path along the connected nodes between $x_i$ and $x_j$), $\Phi(X_0', X_1')$ denotes the minimum appearance distance between $X_0'$ and $X_1'$, $x_0'$ denotes the closest point in $X_0'$ to $x_i$, and $\lambda$ is a coefficient. In one embodiment, $\lambda$ is set to 0.9. $X_1$ is then made convex by including all points that lie on geodesics between pairs of its points. A set $X_0$ of least weathered points is determined similarly.

Between these two sets, a gradual transition in appearance exists from least weathered to most weathered. According to the relative distances of a point x from the two sets, a degree of weathering of point x is defined as a scalar function of appearance:

$$\varphi(x) = \frac{\phi(x, x'_0)}{\phi(x, x'_0) + \phi(x, x'_1)}$$

where $x_0'$ and $x_1'$ are respectively the closest points in $X_0$ and $X_1$ to x. As exhibited in FIG. 4C, the same weathering degree is correctly determined for the two points indicated by arrows in weather degree map 420 using this approach. Appearance manifold 422 is corrected accordingly. For a weathering process that leads to complex appearance manifolds with significant twist and turns, a greater amount of user input may be needed to separate weathering variations from appearance variations unrelated to weathering.

With the assignment of weathering degree values to points in the appearance manifold, valid sequences of weathered appearance for a surface point may be determined. Since weathering degrees naturally increase over time, the appearance of a point must follow a forward path from a point $x_0$ to $x_n$ that satisfies $\phi(x_{i+1}) \geq \phi(x_i)$ for all neighboring pairs of points $x_i, x_{i+1}$ on the path.

In one embodiment, validity of appearance sequences is utilized as a constraint in weathered appearance synthesis. Validity of appearance means that the weathering degree in the previous frame should be smaller than the weathering degree of the same point in current frame. In other words, the weathering degree of each point in the sequence should be increasing. To generate a valid appearance sequence between two points $x_0, x_n$, a straightforward way is simply to interpolate along the shortest path between them.

In sum, in embodiments herein, with the knowledge that the primary variation of captured BRDFs from a material is caused by weathering, focus is on deriving the non-linear changes in the BRDFs of a given material with respect to weathering degree. Additionally, spatially-variant BRDFs and their temporal variations are handled by embodiments herein.

Source Weathering Degree Maps

By replacing appearance values of the sample (i.e., the BRDF value on each point) with degree values, a source weathering degree map is constructed (block 308). An example weathering degree map 420 is shown in FIG. 4C. The weathering degree map displays spatial variations in weathering degree over the material sample. Although the global distribution of weathering degrees in the weathering degree map tends to be specific to the shape of the material sample, for many materials the local variations are an intrinsic characteristic of its weathered appearance. These textures of weathering degree often change over the course of time. As exemplified in FIG. 4A, neighborhoods at different levels of weathering may exhibit different spatial patterns, while local areas that have similar weathering levels have textures that approximately follow the same stationary stochastic model. In the following appearance synthesis process, these time-variant local weathering characteristics of the material sample may be accounted for.

Appearance Synthesis

Figure 5:
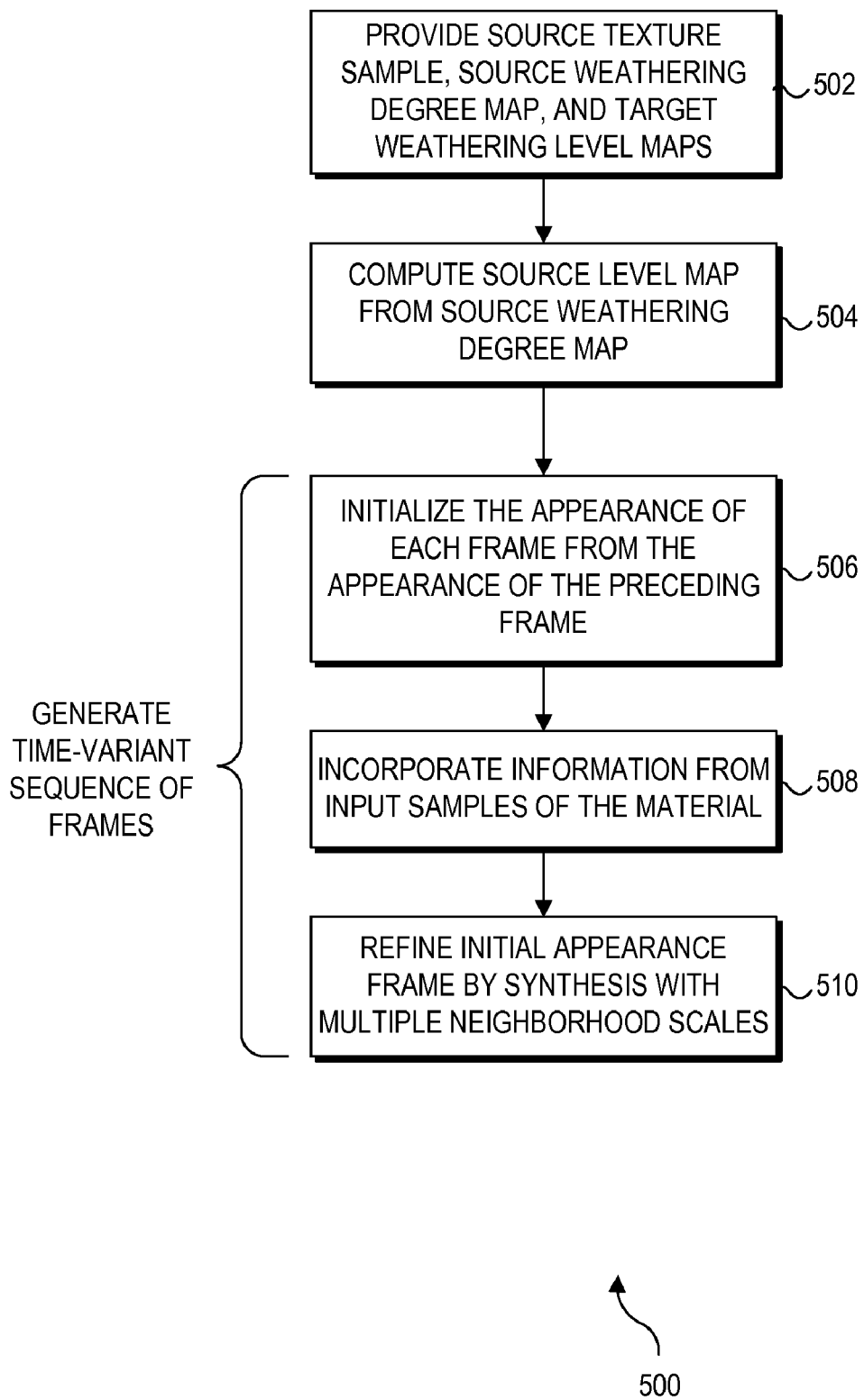
FIG. 5 is a flowchart showing the logic and operations of appearance synthesis in accordance with an embodiment of the invention.

Turning to flowchart 500 of FIG. 5, the logic and operations of an appearance synthesis in accordance with an embodiment of the invention is shown. Starting in block 502, the source texture sample I (also referred to as the material sample) and associated weathering degree map D from the sample analysis are provided. Also, a target weathering level map sequence L' is given for a 3D model that indicates the large scale time-variant distribution of weathering degrees over the surface. This time-variant degree distribution can be generated using existing visual simulation techniques or by manual specification. With the appearance manifold and these inputs, embodiments herein synthesize detailed weathering appearance onto a 3D model according to a given large scale time-variant distribution of weathering degrees over the surface.

Next, source weathering level map L is computed from the source weathering degree map (block 504). In one embodiment, the source weathering degree map is constructed as described above in connection with block 308. The source weathering level map L is the averaged source weathering degree map. The source weathering level map L will be used to specify the candidate regions in the appearance synthesis. To generate local detailed weathering appearance on a 3D model labeled with only large-scale degree variations, pixels on the model and on the material sample are identified that have a similar local level of weathering. The source weathering level map L is computed by averaging the weathering degrees within 2N×2N local neighborhoods in their corresponding source weathering degree map, where N is the largest neighborhood size used in the texture synthesis procedure. Local weathering appearance is then synthesized onto the model in a manner consistent with the original texture map (embodiment discussed below in blocks 506, 508, and 510).

Figure 6:
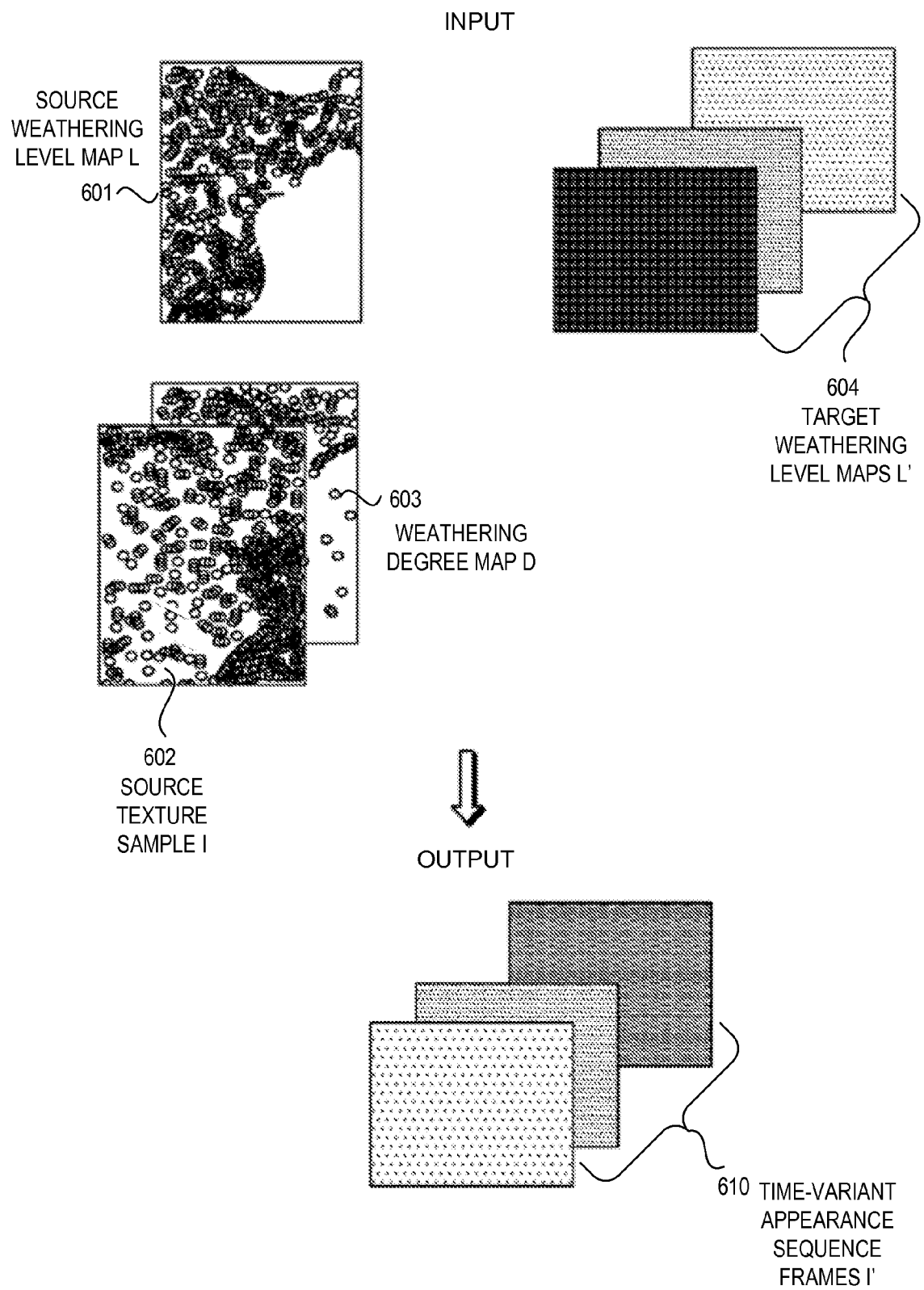
FIG. 6 is a block diagram of appearance synthesis in accordance with an embodiment of the invention.

Referring to FIG. 6, the synthesis algorithm receives the following inputs: source level map L (shown at 601), source texture sample I (shown at 602), weathering degree map D (shown at 603), and target weathering level maps L' (shown at 604). The resulting output is a time-variant appearance sequence of frames I' (shown at 610). The frame sequence I' may be used to produce a time-variant weathered appearance on a surface, such as a 3D model of an object.

In one embodiment, the resulting time variant appearance sequence I' may adhere to two temporal constraints. First, the time-variant appearance sequence for each pixel $p=(x,y)$ should follow a valid path in the appearance manifold. The valid path refers to that path in the appearance manifold graph where all points along the path have monotonic weathering degree values. Second, the spatial characteristics of appearance should change smoothly over time.

A naive approach to appearance synthesis is to generate each frame independently. However, generated appearance sequences would exhibit flickering due to a lack of frame-to-frame coherence. Another possible solution is to synthesize the first frame on the surface and then extrapolate the appearance of each point along the appearance manifold. Although this approach could generate a consistent time sequence for each surface point, a convincing evolution of texture patterns is unlikely to be obtained. These two approaches may leave artifacts when the weathered object is displayed in a video sequence.

One embodiment of generating a time-variant sequence of frames is shown in blocks 506, 508, and 510 of flowchart 500. Embodiments herein use a multi-scale texture synthesis technique to generate a time-variant appearance sequence from input samples. For simplicity, a synthesis algorithm for an image appearance sequence is described. However, one skilled in the art having the benefit of this description will appreciate that the image appearance sequence can be easily modified to synthesize a time-variant appearance sequence on an object, such as a 3D model (e.g., as shown with the gargoyle model at 220).

As illustrated in FIG. 6 for a given input sample texture I(p), its associated weathering degree map D(p), and its source level map L(p), (where pixel $p=(x,y)$) the algorithm may synthesize a time-variant appearance sequence I'(p',$t_i$), at time $t_i$, where $i=0, 1, 2 \ldots, n$. In the time-variant appearance sequence I'(p',$t_i$) local textures are consistent with the sequence of weathering level maps $L'(p',t_i)$ computed from the given large-scale time-variant degree distribution (i.e., there is a one-to-one correspondence between each weathering level map $L'$ and each time-variant appearance sequence frame $I'$.)

Figures 7A, 7B, 7C:
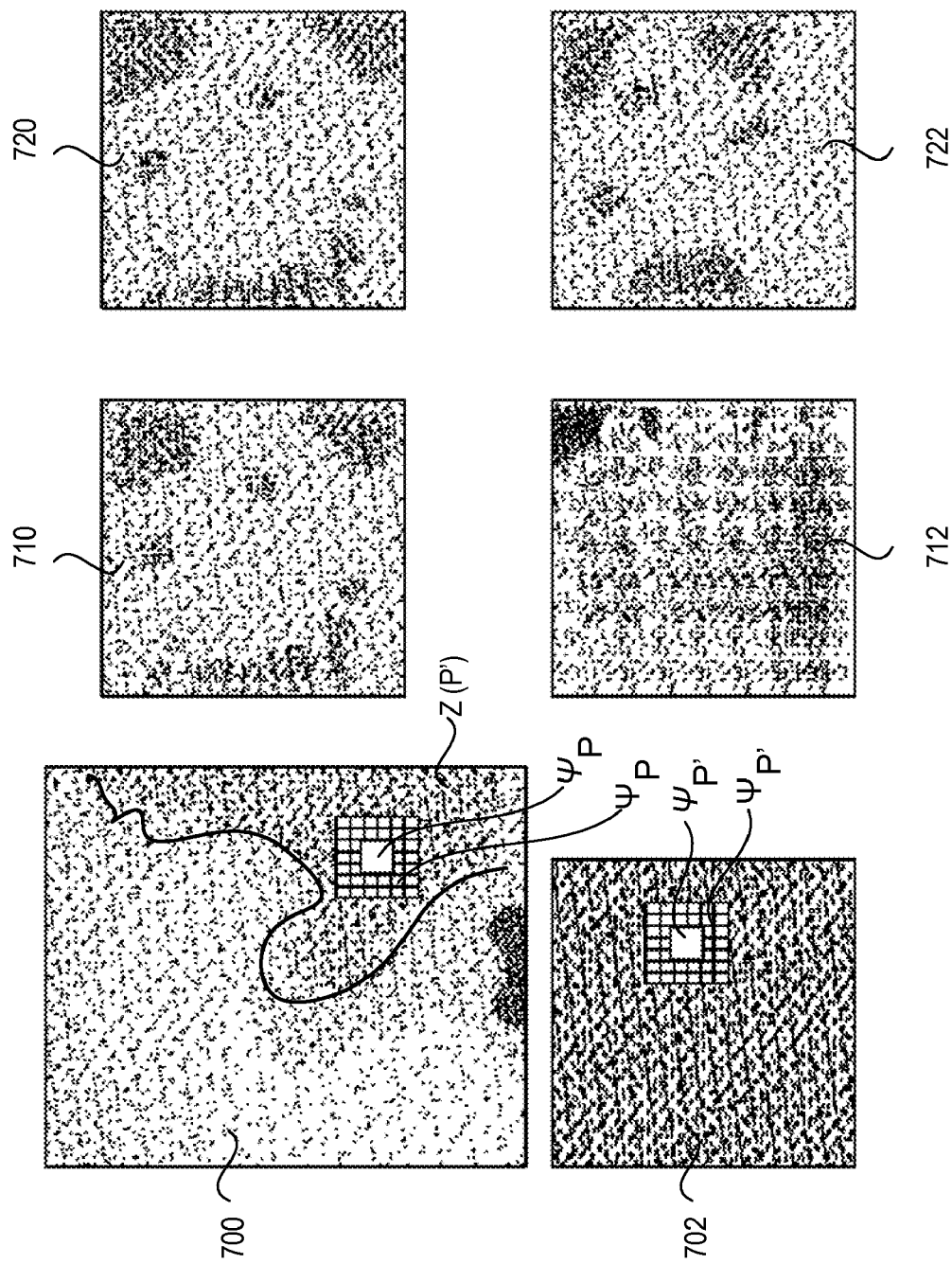
FIG. 7A shows a phase of appearance synthesis in accordance with an embodiment of the invention.
FIG. 7B shows a phase of appearance synthesis in accordance with an embodiment of the invention.
FIG. 7C shows a phase of appearance synthesis in accordance with an embodiment of the invention.

In embodiments of the synthesis algorithm, the appearance sequence is synthesized frame by frame. For each frame, the appearance synthesis is executed in three steps. First, the algorithm initializes the appearance of each frame from the appearance of the preceding frame (block 506). Specifically, the degree values of each frame is initialized by extrapolating those of the preceding frame according to $D'(p',t_i)=D'(p',t_{i-1})+L'(p',t_i)-L'(p',t_{i-1})$ for each pixel $p'$ in the frame. To determine an initial appearance for the frame, interpolation according to these initial degree values along the shortest path in the appearance manifold between points for $I'(p',t_{i-1})$ and the set $X_1$ of most weathered points is performed. Although this initialization produces valid temporal sequences of weathered appearance for each pixel, it does not account for progressive texture variations from frame to frame. Without these progressive changes in local degree distributions, the quality of matches in the synthesis process becomes poor, and this may result in a repetition of texture patterns as illustrated in FIG. 7B. FIG. 7B shows initial values extrapolated from the preceding frame at 710 and the resulting synthesized frame 712 which contains undesirable repetition of texture patterns.

In the second step, to avoid this repetition problem, information from input samples of the material (i.e., the original material sample) are incorporated to obtain an improved initialization (block 508). In short, randomness is introduced into the frames by incorporating appearance values from randomly selected patches from the material sample. The patches are selected randomly from a specific region of the material but not randomly from the whole map. The specific region has a similar degree value with the corresponding region in the target weathering map (i.e., their values in the corresponding level maps (source level map and target weathering level map) are similar.) As illustrated in input sample 700 of FIG. 7A, let $\Psi_p$ and $\psi_p$ respectively represent an N×N neighborhood and an m×m sub-neighborhood centered on p, where m=N/3 in one embodiment. The frame is divided into a set of m×m patches, and denote as $P'$ the centers of all these non-overlapping patches. For each $p' \in P'$, the appearance values are averaged in neighborhood $\psi_{p'}$ with those in $\psi_p$ of a randomly selected pixel p from a candidate set $$Z(p')=\{p:|L(p)-L'(p',t_i)|\leq \kappa\},$$

where $\kappa=0.15$ in one embodiment ($\kappa$ is a value used to control the range of the candidate region in source texture samples). With this approach, changes in texture characteristics over time can effectively be incorporated. For the first frame in the sequence, which cannot be extrapolated from others, its values $I'(p',t_0)$ and $D'(p',t_0)$ are initialized based on random patches $\psi_p$ from candidate sets $Z(p')$. In FIG. 7A, input sample texture 700 contains the set $Z(p')$ of candidates for $p'$ in a synthesized frame 702.

In the third step, the initial appearance frame is refined by synthesis with multiple neighborhood scales (i.e., sizes of the neighborhoods) (block 510). For each frame synthesized, there will be an initial frame. For each scale, the synthesis algorithm traverses all pixels in $P'$ and synthesizes an m×m patch for each pixel. Specifically, for each $p' \in P'$, the algorithm constructs its candidate set $Z(p')$ and then searches for the pixel p in I whose patch $\Psi_p$ best matches $\Psi_{p'}$ in the $L^2$-norm. For the search result $\Psi_p$, the algorithm copies $q \in \psi_p$ to $q' \in \Psi_{p'}$ if it is temporally coherent, i.e., the degree value of q is greater than or equal to that of $q'$ in the preceding frame. Otherwise, the appearance and degree values of $q'$ are kept unchanged. This procedure is repeated for successively smaller sizes of $\Psi_p$ until N is decreased to 3. FIG. 7C displays the final synthesis result (at frame 722) refined from the improved initial values in frame 720. In FIG. 7C, improvement of initial values in frame 720 is performed by considering neighborhood information on the input sample 700. The resulting synthesized frame 722 is shown.

In one embodiment, for greater efficiency, selected key frames from the sequence are synthesized and intermediate frames are interpolated. This is because in some cases, a frame-by-frame synthesis of the appearance sequence is time-consuming and not necessary because of the small changes in appearance and degree between the two adjacent frames. With the first frame as a key frame $k_0$, successive key frames are selected according to $\{k_i | \max_p(L'(p',k_i)-L'(p',k_{i-1}))>\epsilon\}$. In one embodiment, $\epsilon$ is set to 0.2. The appearance of each pixel in an intermediate frame is interpolated along the shortest path in the appearance manifold between the corresponding pixels in the preceding and subsequent key frames.

Example Applications

With the association of weathering degrees to appearance vectors, other weathering applications become easy to formulate. Non-limiting example applications include weathering and deweathering the appearance of a real object and transferring material from one object to another with weathering effects.

Weathering and Deweathering

Figure 10:
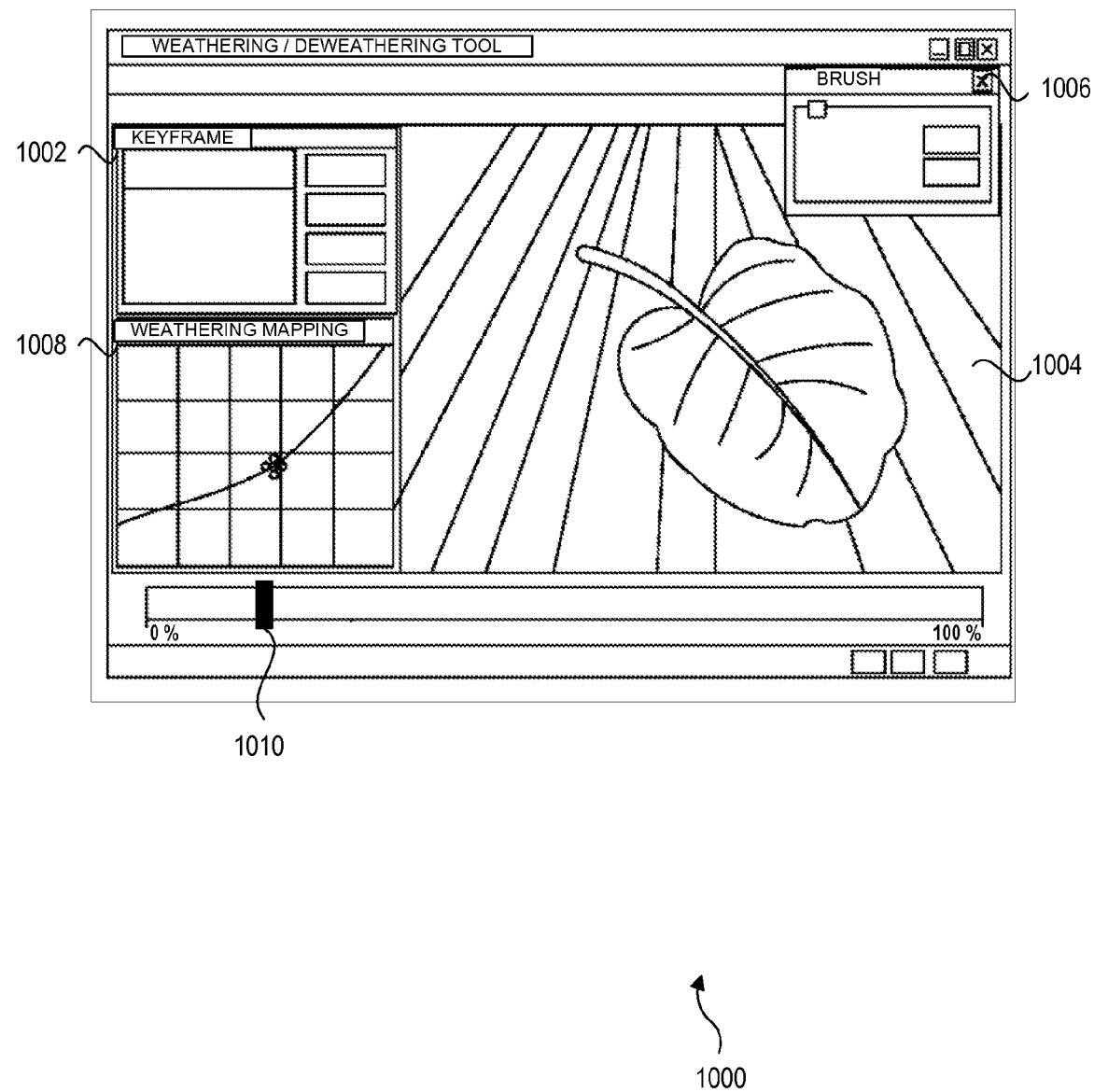
FIG. 10 is a weathering/deweathering user tool in accordance with an embodiment of the invention.

In weather and deweathering of an input weathered object (or input image), sample analysis is first performed to obtain the object's weather degree map, which is then used to generate a time-variant degree sequence with some user assistance. In one embodiment, to aid the user in this process, a user tool 1000 as shown in FIG. 10 may be provided to the user for easy editing of a default degree sequence with interactively updated appearance sequences displayed as feedback.

In the default weathering degree sequence, the user can select key frames for degree modification (key frame selected at 1002 and key frame displayed at 1004). With the user tool, the degree values d in a key frame can be transformed to new values d' by adjusting a mapping function $d'=f(d)$. Additionally, the tool allows the user to hand-paint degree modifications in a key frame (brush tool shown at 1006). As the user applies these alterations, the degree values in non-key frames are interpolated among key frames. To efficiently update the appearance sequence after each degree sequence revision, the user tool simply warps the appearance sequence of each pixel in correspondence with its change in degree. After the user has fully completed adjusting the degree sequence, the original appearance synthesis procedure is applied again to obtain a more refined appearance sequence.

A weather mapping is shown at 1008 and is used to adjust the weathering degree of current frame. The slider at 1010 is used to slide along the time axis to different frames.

In one embodiment, the default degree sequence is computed by placing the object's degree map at the center of the sequence and linearly increasing (or decreasing) the degree values in weathering (or deweathering) frames until all degree values reach 1.0 for weathering (or 0.0 for deweathering). A corresponding default appearance sequence is then computed using the appearance synthesis algorithm described above. The input appearance of the object is used as the initial appearance frame from which the rest of the default sequence is synthesized into the future and the past.

Weathering Transfer

Another image-based application is to render a weathered object $O_1$ with a different material of another weathered object $O_2$. With user assistance, a sample analysis on the two objects is performed to determine their weathering characteristics, and then synthesizing the appearance of $O_2$ onto $O_1$ in a manner consistent with $O_1$'s shape-dependent weathering degree distribution. This appearance synthesis proceeds as in the method described above, except that appearance attributes from $O_2$ are synthesized to the degree map of $O_1$.

The time-variant appearance of $O_1$ can also be synthesized with the material of $O_2$ by extrapolating $O_1$'s degree map into a degree sequence using the techniques for weathering and deweathering discussed above. With this degree sequence, the appearance manifold and degree map of $O_2$ can then be used to synthesize an appearance sequence using methods described above.

Example Results

Embodiments of the invention are not limited by the example results discussed below. In these examples, the appearance manifold system was implemented on a computing device having a Pentium® IV 2.8 GHz CPU, 2 GB memory, and a Nvidia® Geforce7800 256 MB graphics card. Further embodiments of an example computing device for implementing embodiments of the invention are discussed below in connection with FIG. 11. Sample resolutions and the largest window sizes used in appearance synthesis are given in Table 1 for the presented examples. For computational efficiency, the appearance manifold is constructed using 10,000 sampled pixels with distinct appearance vectors, and the weathering degree values of all other pixels are copied from the nearest sample point in the appearance space. For the examples below, sample analysis requires approximately five minutes, and appearance synthesis times range from one to five hours. Rendering is performed at about 20 Hz.

TABLE 1

| | | | Sample resolutions | | | |
|---|---|---|---|---|---|---|
| Sample | Rust | Banana | Leaf | Patina | Wood | Stone |
| Width | 269 | 540 | 970 | 1010 | 640 | 800 |
| Height | 361 | 499 | 712 | 750 | 480 | 498 |
| Window size | 32 | 22 | 5 | 26 | 22 | 32 |

FIG. 1 displays a rusting gargoyle rendered with global illumination. The global distribution of the rust and its temporal variations are simulated by γ-ton tracing. The characteristics of the local rust patterns on the gargoyle change with time in consistency with the different neighborhoods in the original sample at different weathering levels.

It is also noted that there are appearance differences between linear texture blending and embodiments of a non-linear appearance manifold technique as described herein. Linear blending is seen to produce appearances that diverge considerably from rusting iron, such as rust colors with significant specularity.

Figure 8:
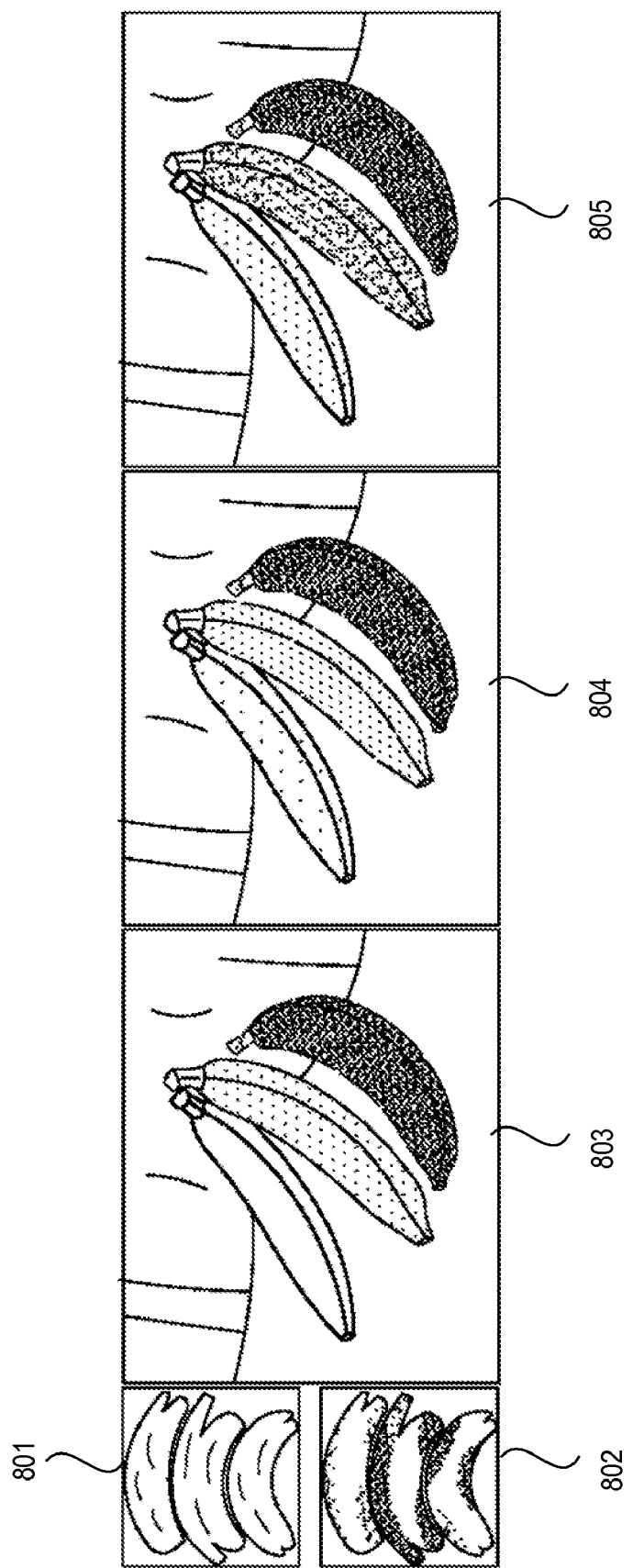
FIG. 8 shows examples of modeling the time-variant appearance of materials in accordance with embodiments of the invention.

Three bananas at different states of weathering are exhibited in FIG. 8 where their appearances are all synthesized using the material sample 801 and the weather degree map 802. Images 803-805 show rendering results of bananas under global illumination from least weathered in image 803 to most weathered in image 805. The most weathered banana at the bottom of each image 803-805 is kept constant for reference. In this example, the initial degree map on the rendered bananas is specified by an artist, and then the weathering/deweathering procedure is used to generate the weathering sequence. The appearance of spatial variations and their evolution over time are synthesized onto the new objects to produce convincing results.

Figure 9:
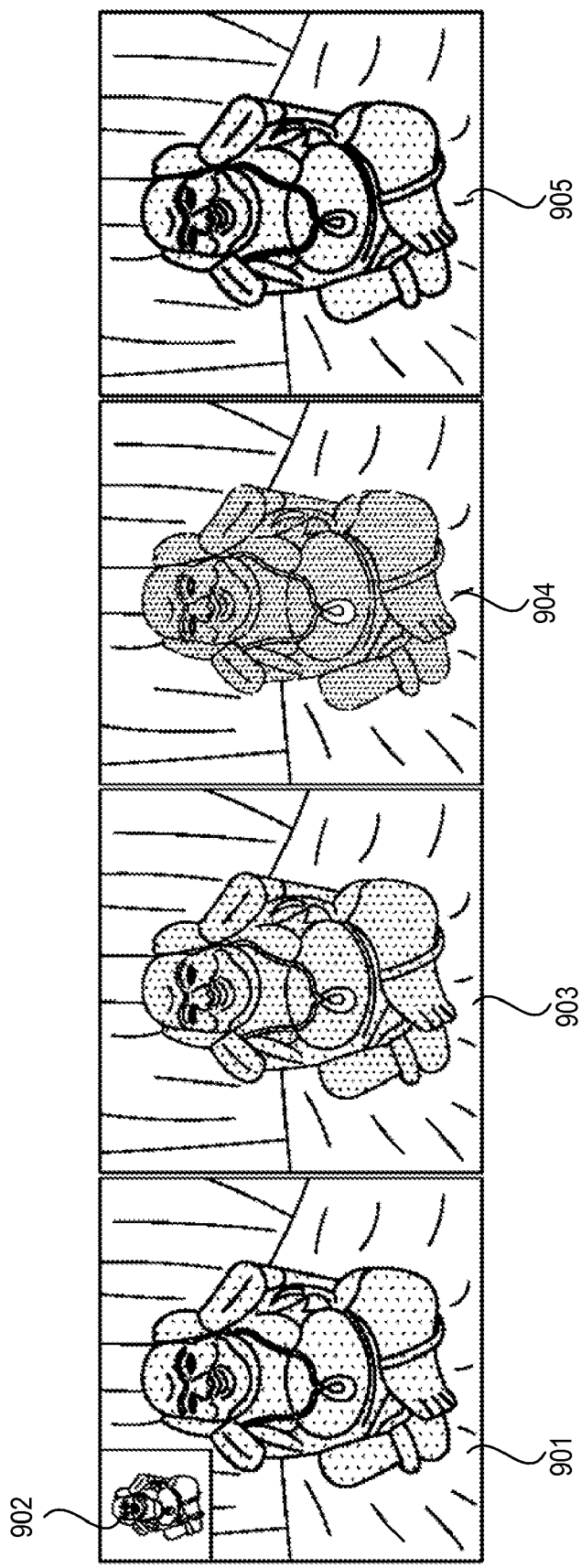
FIG. 9 shows examples of modeling the time-variant appearance of materials in accordance with embodiments of the invention.

FIG. 9 displays a Buddha model 901 scanned from a real object Buddha with textures generated using the texture montage technique. To compute its weathering degree map (shown at 902) the diffuse color of the Buddha is analyzed under ambient lighting, which clearly reveals variations of tarnish on the surface. Based on this analysis, weathering transfer generates renderings of the Buddha in FIG. 9 that are consistent with the weathering degrees of the original model, but utilizes different weathered materials. The Buddha with transferred brass and patina effects is shown at 903. The Buddha with transferred stone and weathering effects is shown at 904. And the Buddha with transferred wood and weathering effects is shown at 905.

One application of the appearance manifold technique is weathering and deweathering of an object shown in a single image. In this application, the object of interest is segmented out and then a sample analysis is performed on the object of interest. To minimize the effects of intensity variations due to shading, pixel colors are converted into $L\alpha\beta$ space and then only the $\alpha\beta$ channels are used for analysis. To each degree value d, the algorithm associates the average luminance $L_d$ of all pixels of the same degree. Shading variations in the image are then approximately separated from weathering and stored in a illumination map $L'(x,y)=L(x,y)/L_{d(x,y)}$, where $L(x,y)$ is the original luminance of the pixel and $d(x,y)$ denotes the pixel degree. After generating a new weathering degree map as described above in connection with appearance syntheses, the weathered/deweathered color for each pixel is obtained by interpolating along the shortest path from its point in the appearance manifold to the most/least weathered point sets. The final result is obtained by multiplying the illumination map with the weathering color image. Non-weathering variations such as from sharp specularities and texture may reduce the performance of this basic method, but could potentially be addressed by further image analysis. Since the input is just a single image, this application targets weathering effects that primarily alter only color appearance features.

CONCLUSION

Embodiments of an appearance manifold technique described herein generate weathering sequences that are consistent with the changing local reflectance characteristics of a material over time using input data from only a single material sample at a single time instance. It complements existing visual simulation techniques that are designed to compute weathering degree distributions, and leads to various weathering applications for synthetic 3D models, real weathered objects, and even single snapshots of weathered objects. With this method, the input data is simple to acquire, and natural non-linear appearance variations over time are easy to produce.

Since reorganization of appearance data into an appearance manifold determines only a sequential relationship among the observed weathered appearances, rather than correspondences to actual degrees of weathering, the simulations of weathering effects are not physically precise. However, embodiments herein generate visually compelling weathered appearance from a small amount of easily captured image data.

Although input data from only a single material sample and time instant is needed, embodiments of appearance manifold analysis can also jointly handle data from multiple samples and instants in time, as long as the data all represents the same weathering process of the same material. Without the need for surface point correspondences, BRDFs can be recorded at different times without image registration. This property is particularly useful in broadening the range of modeled weathering effects. For example, sample analysis for the banana in FIG. 8 was performed using two bananas at different stages of ripening.

Example Computing Environment

Figure 11:
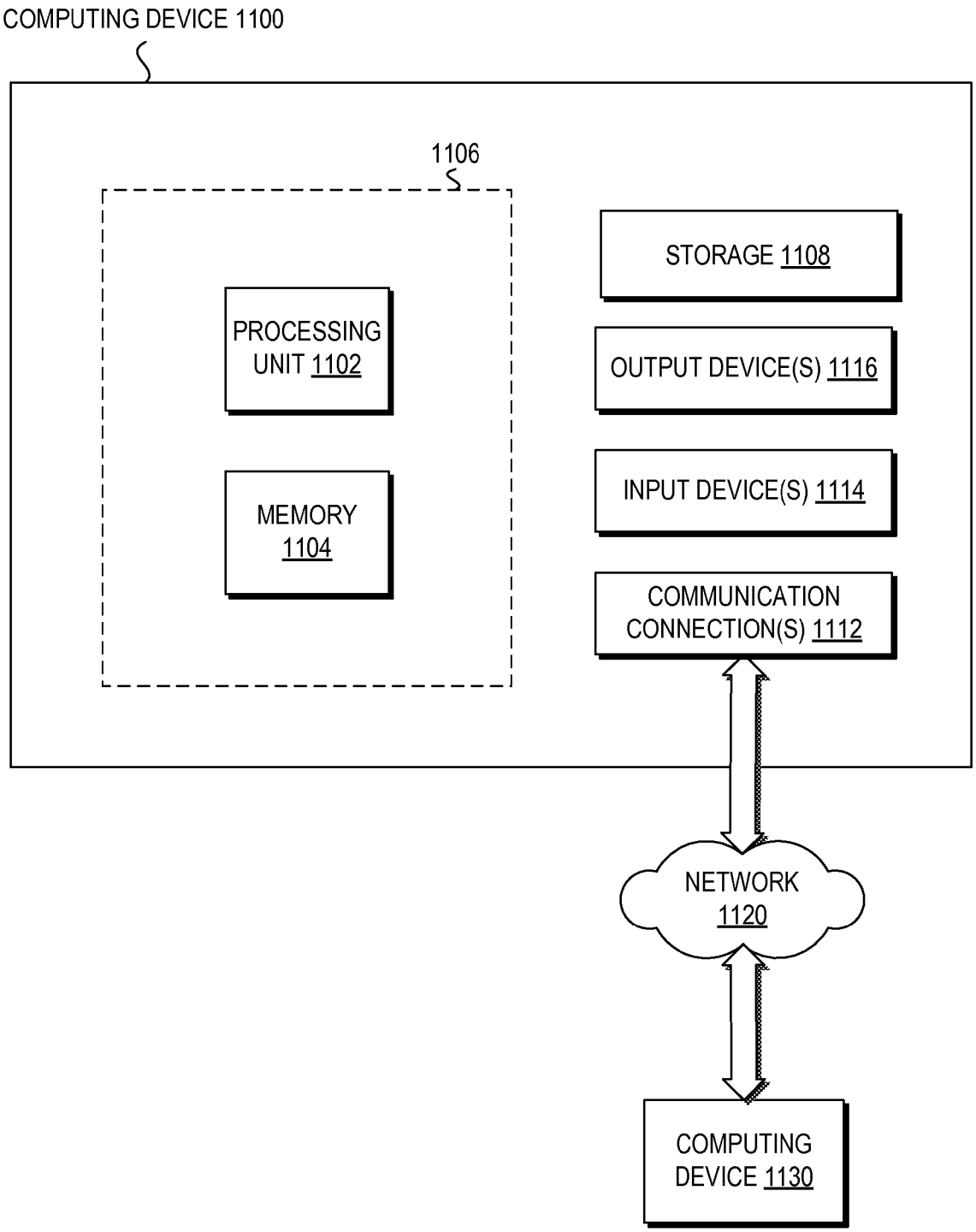
FIG. 11 is a block diagram of an example computing device for implementing embodiments of the invention.

FIG. 11 and the following discussion are intended to provide a brief, general description of a suitable computing environment to implement embodiments of the invention. The operating environment of FIG. 11 is only one example of a suitable operating environment and is not intended to suggest any limitation as to the scope of use or functionality of the operating environment. Although not required, embodiments of the invention will be described in the general context of "computer readable instructions" being executed by one or more computing devices. Computer readable instructions may be distributed via computer readable media. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 shows an example of a computing device 1100 for implementing one or more embodiments of the invention. Computing device 1100 may include, but is not limited to, a desktop computer, notebook computer, server computer, mobile device (such as a mobile phone, Personal Digital Assistant (PDA), media player, and the like), multiprocessor system, consumer electronics device, mini computer, mainframe computer, and the like. In one configuration, computing device 1100 includes at least one processing unit 1102 and memory 1104. A processing unit 1102 may include a processor, such as a CPU, a processing core, and the like. Depending on the exact configuration and type of computing device, memory 1104 may be volatile (such as RAM), non-volatile (such as ROM, flash memory, etc.) or some combination of the two. This configuration is illustrated in FIG. 11 by dashed line 1106. In one embodiment, processing unit 1102 executes computer readable instructions stored in memory 1104.

In other embodiments, device 1100 may include additional features and/or functionality. For example, device 1100 may also include additional storage (e.g., removable and/or non-removable) including, but not limited to, magnetic or optical disks or tape. Such additional storage is illustrated in FIG. 11 by storage 1108. In one embodiment, computer readable instructions to implement embodiments of the invention may be stored in storage 1108. Storage 1108 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1104 and storage 1108 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1100. Any such computer storage media may be part of device 1100.

Device 1100 may also include communication connection(s) 1112 that allow device 1100 to communicate with other devices, such as computing device 1130, through network 1120. Communication connection(s) 1112 may include a wired interface or a wireless interface. Communication connection(s) 1112 may include, but is not limited to, a modem, a Network Interface Card (NIC), an integrated network interface, a radio frequency transmitter/receiver, an infrared port, or other interfaces for connecting computing device 1100 to other computing devices. Communication connection(s) 1112 may transmit and/or receive communication media.

The term "computer readable media" may include communication media. Communication media typically embodies computer readable instructions or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 1100 may include input device(s) 1114 such as keyboard, mouse, pen, voice input device, touch input device, infra-red cameras, video input devices, and/or any other input device. Output device(s) 1116 such as one or more displays, speakers, printers, and/or any other output device may also be included in device 1100.

Components of computing device 1100 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. Input devices 1114 and output devices 1116 may be connected to device 1100 via a wired connection, wireless connection, or any combination thereof.

Those skilled in the art will realize that storage devices utilized to store computer readable instructions may be distributed across a network. For example, a computing device 1130 accessible via network 1120 may store computer readable instructions to implement one or more embodiments of the invention. Computing device 1100 may access computing device 1130 and download a part or all of the computer readable instructions for execution. Alternatively, computing device 1100 may download pieces of the computer readable instructions, as needed, or some instructions may be executed at computing device 1100 and some at computing device 1130. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method for modeling a time-variant appearance of a material sample, comprising:
   employing a processor that executes instructions retained in a computer-memory, the instructions when executed by the processor implement at least the following operations:
   performing a sample analysis of the material sample, wherein the sample analysis orders surface points of the material sample with respect to weathering from data captured at a single instant in time; and
   performing an appearance synthesis using the sample analysis, wherein the appearance synthesis generates a time-variant sequence of frames for weathering an object.

2. The method of claim 1 wherein performing the sample analysis includes:
   constructing an appearance manifold from the data captured at the single instant in time, wherein the appearance manifold approximates the underlying subspace of weathered surface point appearances of the material sample.

3. The method of claim 2, further comprising:
   annotating, by a user, a set of most weathered and a set of least weathered surface points in the appearance manifold.

4. The method of claim 3, further comprising:
   constructing a weathering degree map from the annotated appearance manifold, wherein the weathering degree map describes variations in weathering degree over the material sample.

5. The method of claim 4 wherein performing the appearance synthesis includes:
   computing a source level map from the weathering degree map.

6. The method of claim 5 wherein the time-variant sequence of frames is generated from target weathering level maps, the weathering degree map, the material sample, and the source level map.

7. The method of claim 6 wherein generating the time variant sequence of frames includes:
   initializing the appearance of each frame from the appearance of the preceding frame;
   incorporating appearance values from patches of the material sample; and
   refining the initial appearance frame by synthesis from multiple neighborhood scales.

8. The method of claim 7 wherein the appearance synthesis is performed on key frames and the appearance of the intermediate frames between the key frames are interpolated, wherein the appearance of each pixel in an intermediate frame is interpolated along the shortest path in the appearance manifold between the corresponding pixels in the preceding and subsequent key frames.

9. The method of claim 1, further comprising:
   weathering of an input, wherein the input includes at least one of an input weathered object or an input image; and
   deweathering of the input.

10. The method of claim 9 wherein weathering and deweathering is performed in response to inputs received at a user tool.

11. The method of claim 1, further comprising:
   transferring the weathering of the material from the object to another object.

12. One or more computer readable media, having computer-readable instructions recorded thereon that, when executed by one or more processors, perform operations comprising:
   performing a sample analysis of a material, wherein the sample analysis orders surface points of the material relative with respect to weathering from data captured at a single instant in time; and
   performing an appearance synthesis using the sample analysis, wherein the appearance synthesis generates a time-variant sequence of frames for weathering an object.

13. The one or more computer storage media of claim 12 wherein performing the sample analysis includes:
   constructing an appearance manifold from the data captured at the single instant in time, wherein the appearance manifold approximates the underlying subspace of weathered surface point appearances of the material.

14. The one or more computer storage media of claim 13, wherein the computer readable instructions when executed by the one or more processors further perform operations comprising:
   receiving input that annotates a set of most weathered and a set of least weathered surface points in the appearance manifold; and
   constructing a weathering degree map from the annotated appearance manifold, wherein the weathering degree map describes variations in weathering degree over the material.

15. The one or more computer storage media of claim 12 wherein generating the time variant sequence of frames includes:
   initializing the appearance of each frame from the appearance of the preceding frame;
   incorporating appearance values from patches of the material; and
   refining the initial appearance frame by synthesis from multiple neighborhood scales.

16. The one or more computer storage media of claim 15 wherein the synthesis is performed on key frames and intermediate frames between the key frames are interpolated, wherein the appearance of each pixel in an intermediate frame is interpolated along the shortest path in the appearance manifold between the corresponding pixels in the preceding and subsequent key frames.

17. The one or more computer storage media of claim 12 wherein the time-variant sequence of frames is synthesized onto a 3-dimensional object.

18. A system, comprising:
   one or more processing units; and
   one or more computer readable media communicatively coupled to the processing unit, the one or more computer readable media having stored computer readable instructions that when executed by the one or more processing units perform operations comprising:

performing a sample analysis of a material, wherein the sample analysis orders surface points of the material with respect to weathering from data captured at a single instant in time; and performing an appearance synthesis using the sample analysis, wherein the appearance synthesis generates a time-variant sequence of frames for weathering an object.

19. The system of claim 18 wherein performing the sample analysis further includes:

constructing an appearance manifold from the data captured at the single instant in time, wherein the appearance manifold approximates the underlying intrinsic structure of weathered surface point appearances of the material;

receiving input that annotates a set of most weathered and a set of least weathered surface points in the appearance manifold; and constructing a weathering degree map from the annotated appearance manifold, wherein the weathering degree map describes variations in weathering degree over the material.

20. The system of claim 18 wherein generating the time variant sequence of frames includes:

initializing the appearance of each frame from the appearance of the preceding frame;

incorporating appearance values from patches of the material; and refining the initial appearance frame by synthesis from multiple neighborhood scales.

* * * * *